US010525607B1

(12) United States Patent
Vayntraub

(10) Patent No.: US 10,525,607 B1
(45) Date of Patent: Jan. 7, 2020

(54) CUTTING TOOL

(71) Applicant: Vladimir Vayntraub, Fallbrook, CA (US)

(72) Inventor: Vladimir Vayntraub, Fallbrook, CA (US)

( * ) Notice: Subject to any disclaimer, the term of this patent is extended or adjusted under 35 U.S.C. 154(b) by 0 days.

(21) Appl. No.: 16/150,157

(22) Filed: Oct. 2, 2018

Related U.S. Application Data

(62) Division of application No. 15/861,407, filed on Jan. 3, 2018, now abandoned.

(51) Int. Cl.
*A01G 3/025* (2006.01)
*B26B 27/00* (2006.01)
*B25G 1/10* (2006.01)

(52) U.S. Cl.
CPC ................ *B26B 27/00* (2013.01); *B25G 1/10* (2013.01)

(58) Field of Classification Search
CPC .......... B26B 27/00; B25G 1/10; B23D 21/06; A01G 3/0251; A01G 3/0475
USPC ............. 30/228, 244, 249; 81/165, 355, 358
See application file for complete search history.

(56) References Cited

U.S. PATENT DOCUMENTS

| | | | | | |
|---|---|---|---|---|---|
| 385,353 | A * | 7/1888 | Hilton | | |
| 472,139 | A * | 4/1892 | Newton | | |
| 534,112 | A * | 2/1895 | Leavitt | | |
| 700,168 | A * | 5/1902 | Brown | | |
| 2,093,932 | A * | 9/1937 | Schwalb, Jr. | A01G 3/0255 | 30/185 |
| 2,246,730 | A * | 6/1941 | Hafdell | A01G 3/0255 | 30/237 |
| 2,539,124 | A * | 1/1951 | Findlay | B23D 21/10 | 30/92 |
| 2,763,926 | A * | 9/1956 | Pate | A01G 3/0255 | 30/272.1 |
| 2,877,550 | A * | 3/1959 | Scuderi | B26F 1/382 | 30/228 |
| 3,199,193 | A * | 8/1965 | Norty | B23D 29/002 | 30/228 |
| 3,710,445 | A * | 1/1973 | Roth | B26B 15/00 | 30/241 |
| 3,755,894 | A * | 9/1973 | Burdick | B26B 17/00 | 30/181 |
| 4,069,583 | A * | 1/1978 | Stubbings | B23D 33/04 | 30/228 |
| 5,012,579 | A * | 5/1991 | Matsumoto | B26D 3/16 | 30/243 |
| 5,018,275 | A * | 5/1991 | Huang | B26B 13/26 | 30/124 |
| 5,046,250 | A * | 9/1991 | Huang | B25B 7/12 | 30/115 |

(Continued)

*Primary Examiner* — Kenneth E Peterson
*Assistant Examiner* — Nhat Chieu Q Do
(74) *Attorney, Agent, or Firm* — Quickpatents, LLC; Kevin Prince

(57) ABSTRACT

A cutting tool is disclosed with an elongated, hollow first handle. An extension mechanism fixed with the first handle's distal end features a housing with a blade slot and blade connected with gears rotationally fixed with the housing. The proximal end of the housing's extension rod slides within the first handle, and its distal end terminates at a rigid hook with a first gear rack that engages the pinion gears. The cutting tool is suited for safety and ease-of-use in small, tight or otherwise difficult to reach environments.

4 Claims, 9 Drawing Sheets

(56) References Cited

U.S. PATENT DOCUMENTS

| | | | | | |
|---|---|---|---|---|---|
| 5,050,465 | A * | 9/1991 | Haugs | B25B 7/12<br>81/126 |
| 5,218,765 | A * | 6/1993 | Huang | B25B 7/12<br>30/241 |
| 5,862,593 | A * | 1/1999 | Huang | B23D 21/06<br>30/182 |
| 6,467,172 | B1 * | 10/2002 | Jenq | B26D 3/169<br>30/243 |
| 7,530,172 | B1 * | 5/2009 | Wu | A01G 3/0251<br>30/244 |
| 8,024,864 | B2 * | 9/2011 | Mortensen | B26B 17/02<br>30/188 |
| 8,943,699 | B2 * | 2/2015 | Strohmeier | B23D 27/02<br>30/228 |
| 2008/0189954 | A1 * | 8/2008 | Lin | B23D 21/10<br>30/92 |
| 2012/0137527 | A1 * | 6/2012 | Huang | A01G 3/0251<br>30/185 |

* cited by examiner

CUTTING TOOL

CROSS-REFERENCE TO RELATED APPLICATIONS

This application is a divisional application of U.S. Utility patent application Ser. No. 15/861,407, filed on Jan. 3, 2018, and incorporated herein by reference.

STATEMENT REGARDING FEDERALLY SPONSORED RESEARCH AND DEVELOPMENT

Not Applicable.

FIELD OF THE INVENTION

This invention relates to cutting tools, and more particularly to a cutting tool featuring a dual-action blade and adapted to provide superior safety and ease-of-use in a light-weight form factor suited for small, tight, or otherwise difficult to reach environments, by means of: a design usable either while the cutting tool is directly in hand or fixed onto a pole; mechanisms that do not include ropes or anything else that may become jammed or tangled during normal operation; a gear-powered, hand-actuated linear or rotational cutting mechanism requiring minimal force to actuate; a storage area that completely contains the cutting edge of the blade when it is not in use; and a sealed enclosure that is cleaner, more compact, and more reliable than other contemporary cutting tools.

BACKGROUND

This invention relates to cutting tools, and more particularly to a cutting tool featuring a dual-action blade and hook, and adapted to provide superior safety and ease-of-use in a light-weight form factor suited for small, tight, or otherwise difficult to reach environments, by means of: a design usable either while the cutting tool is directly in hand or fixed onto an extension pole; mechanisms that do not include ropes or anything else that may become jammed or tangled during normal operation; a gear-powered, hand-actuated linear- or pivot-based cutting mechanism requiring minimal force to actuate; a storage area that completely contains the cutting edge of the blade when it is not in use; and a smaller path of travel of the handles to actuate the blade, allowing for use in more confined areas.

The prior art includes: U.S. Pat. No. 385,353 (Jul. 3, 1888); U.S. Pat. No. 2,763,926 (Sep. 25, 1956); U.S. Pat. No. 2,877,550 (Jul. 16, 1958); U.S. Pat. No. 3,199,193 (Aug. 10, 1965); U.S. Pat. No. 3,710,445 (Jan. 16, 1973); U.S. Pat. No. 4,069,583 (Jan. 24, 1978); U.S. Pat. No. 5,046,250 (Sep. 10, 1991); U.S. Pat. No. 5,218,765 (Jun. 15, 1993); U.S. Pat. No. 5,862,593 (Jan. 26, 1999); U.S. Patent Application No. 20080189954 (Aug. 14, 2008); U.S. Pat. No. 8,024,864 (Sep. 27, 2011); U.S. Pat. No. 8,943,699 (Feb. 3, 2015). It is desirable to have an improved cutting tool that is superior to any that is disclosed or suggested in the identified references.

SUMMARY

The present device is a cutting tool for use to cut an object. The cutting tool comprises: an elongated first handle having a distal end and a proximal end. Preferably, the first handle is hollow and defines a cavity therewithin. The cutting tool further comprises an extension mechanism fixed with the distal end of the first handle and having a housing. The housing has a blade slot and further includes at least partially therein a blade. The blade is connected with at least one pinion gear, and the at least one pinion gear is rotationally fixed with the housing. The housing further includes an extension rod having a proximal end fixed slidably within or alongside the first handle and a distal end terminating at a rigid hook. The rigid hook has a first gear rack engaged with the at least one pinion gear. As such, as the extension rod moves the hook in one direction, the pinion gear(s) spin to move the blade in the opposite direction. In those preferred embodiments where the first handle is hollow and defines a cavity therewithin, the extension rod is slidably disposed within the cavity.

The cutting tool further comprises a second handle pivotally fixed with the first handle and the proximal end of the extension rod. In some preferred embodiments of the cutting tool the at least one pinion gear is fixed with the blade at a second gear rack. In such embodiments, the blade and the rigid hook move linearly towards or away from each other when the second handle is actuated. In other preferred embodiments, the at least one pinion gear is fixed to the blade. In such embodiments, when the second handle is actuated, the blade moves rotationally towards or away from the rigid hook, and the rigid hook moves linearly towards or away from the distal end of the first handle. In some hand-actuated embodiments, the first handle is relatively short and a hand-actuated second handle is adapted to directly actuate the extension mechanism.

In some preferred embodiments, the cutting tool further comprises a linear actuator electrically connected between a switch and a power source. Preferably, the switch is situated near the proximal end of the first handle, and is a momentary switch that actuates the blade to move from the open position to the closed position and then back to the open position in one cycle. Alternately the switch further optionally comprises a three-position rocker. The three-position rocker has an open position configured to move the rigid hook and the blade towards the open position; a close position configured to move the rigid hook and the blade towards the closed position; and an off position configured to lock the rigid hook and the blade in place.

The linear actuator is mechanically fixed with the extension rod and configured to move the extension rod within or alongside the first handle to move the blade and the rigid hook between the open position and the closed position. Preferably, the linear actuator includes a hydraulic or pneumatic cylinder. More preferably, the linear actuator includes an electric motor.

In use, actuation of the second handle moves the rigid hook and the blade between an open position, wherein the object may be placed between the rigid hook and the blade, and a closed position, wherein the blade passes through the blade slot and meets the retracting rigid hook to cut the object.

The present invention is a cutting tool featuring a dual-action blade and adapted to provide superior safety and ease-of-use in a light-weight form factor suited for small, tight, or otherwise difficult to reach environments. It achieves this through a design that: is usable either while the cutting tool is directly in hand or fixed onto an extended handle; contains mechanisms that do not include ropes or anything else that may become jammed or tangled during normal operation; incorporates a gear-powered, hand-actuated linear or rotational cutting mechanism requiring minimal force to actuate; includes a storage area that completely contains the cutting edge of the blade when it is not in use; and features a sealed enclosure that is cleaner, more compact, and more reliable than other contemporary cutting tools. The invention is both collapsible for easy and convenient storage and use on objects in the user's immediate vicinity, and also extendable for use on distant objects—thus it is suitable for a vast universe of possible usage scenarios, whether an object is near, far, or located somewhere that would otherwise be difficult or impossible to reach. The invention's blade storage system, which only deploys the blade when it is in use and can optionally lock the blade in place, protects the user both from physical harm and accidental property damage that might result from inadvertent activation. The fully sealed enclosure and gear-based cutting mechanisms aid in a long and productive lifespan. The present invention allows for a longer/higher reach, resulting in less shoulder stress and fatigue in the user, easier use and maneuverability, and more power since the handles do not have to open as far as prior art devices to achieve the same blade travel.

Traditional cutting tools already available to the public, as exemplified by FIG. 1A and FIG. 1B, exhibit none of these advantageous features. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element. Finally, "Detailed Description" refers to this Detailed Description of the Preferred Embodiment.

Figure 1A:
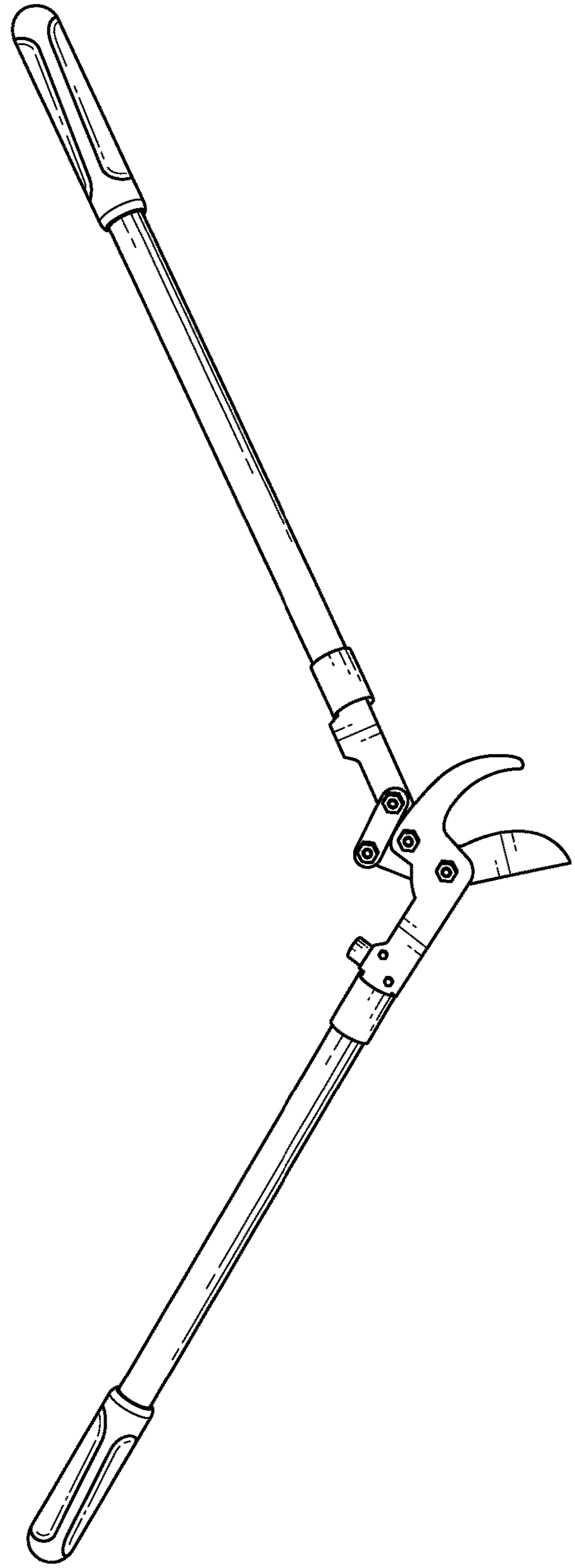
FIG. 1A (Prior Art)
FIG. 1A is a top perspective view of a prior art device with the blade open and ready to receive an object to be cut.
Figure 1B:
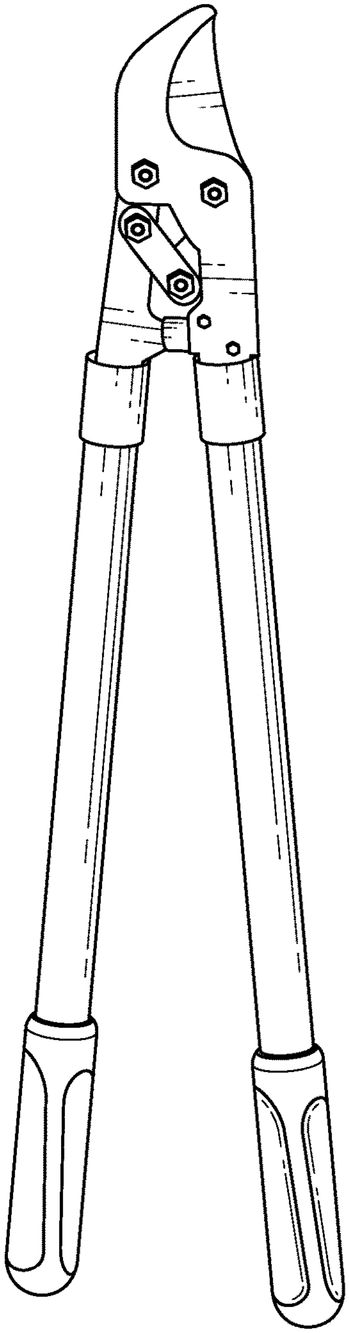
FIG. 1B (Prior Art)
FIG. 1B is a top perspective view of a prior art device with the blade closed.
Figure 2A:
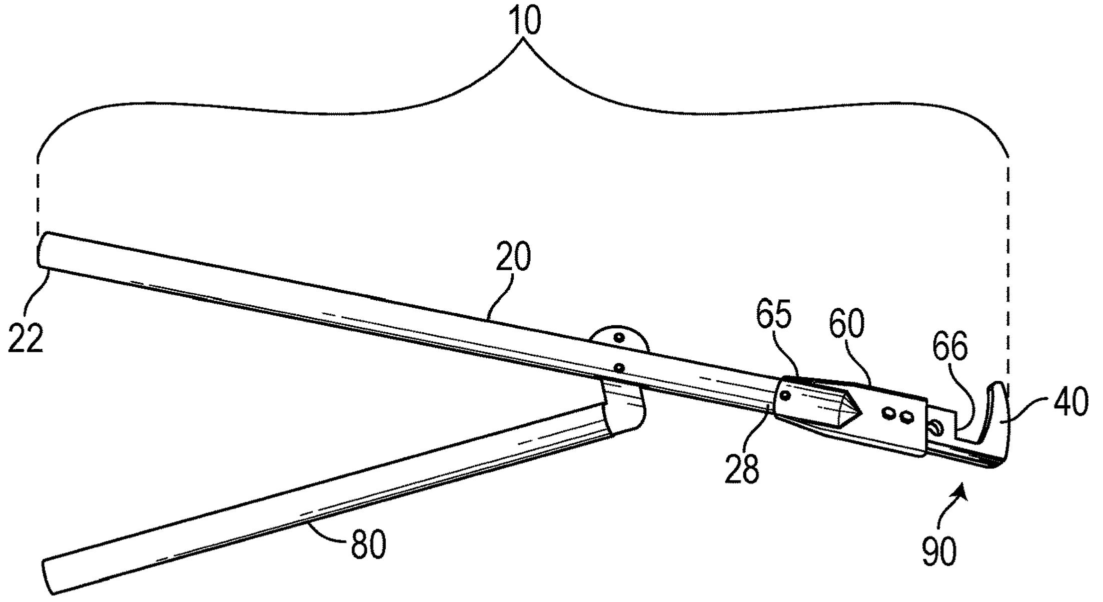
FIG. 2A is a top perspective view of one embodiment of the invention with the blade and rigid hook in the open position, shown configured with a linear cutting mechanism.
Figure 2B:
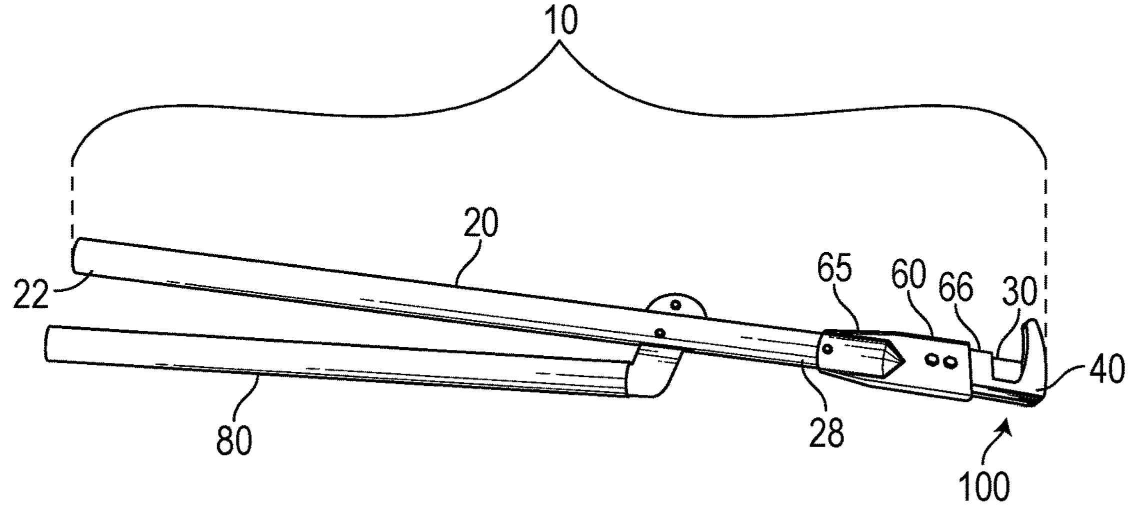
FIG. 2B is a top perspective view of one embodiment of the invention with the blade and rigid hook in the closed position, shown configured with a linear cutting mechanism.
Figure 2C:
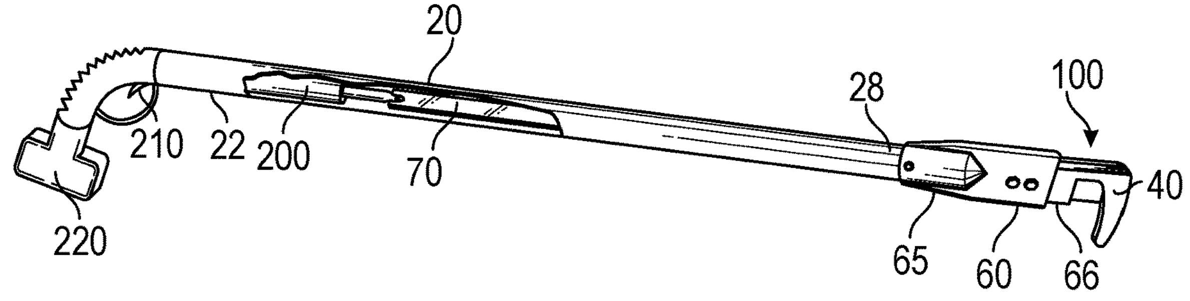
FIG. 2C is a top perspective view, partially cut-away, of an alternate embodiment of the invention having a linear actuator and a power source for moving the blade.
Figure 3:
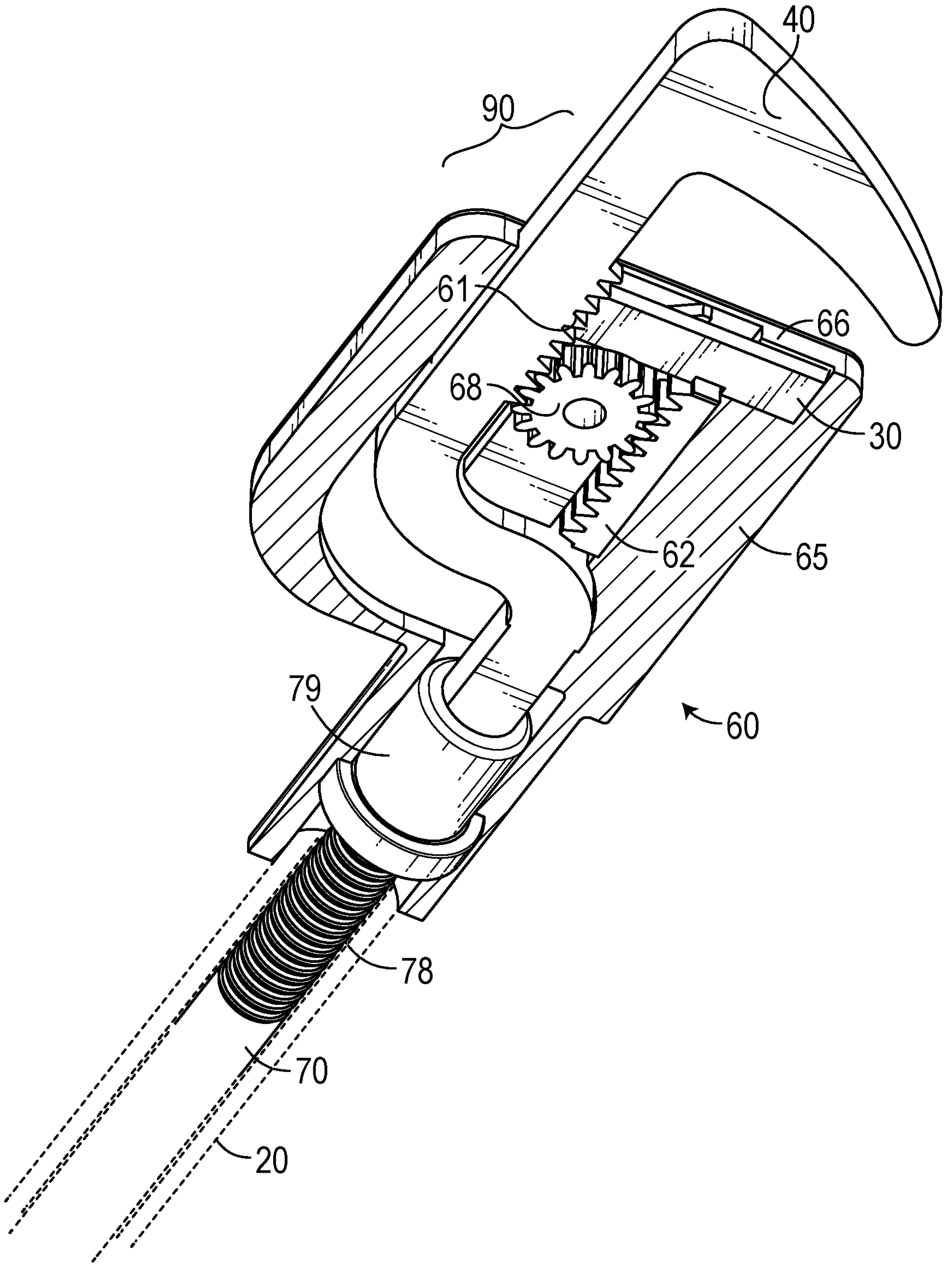
FIG. 3 is a partial cross-sectional side perspective view of one embodiment of the invention, shown configured with a linear cutting mechanism.
Figure 4:
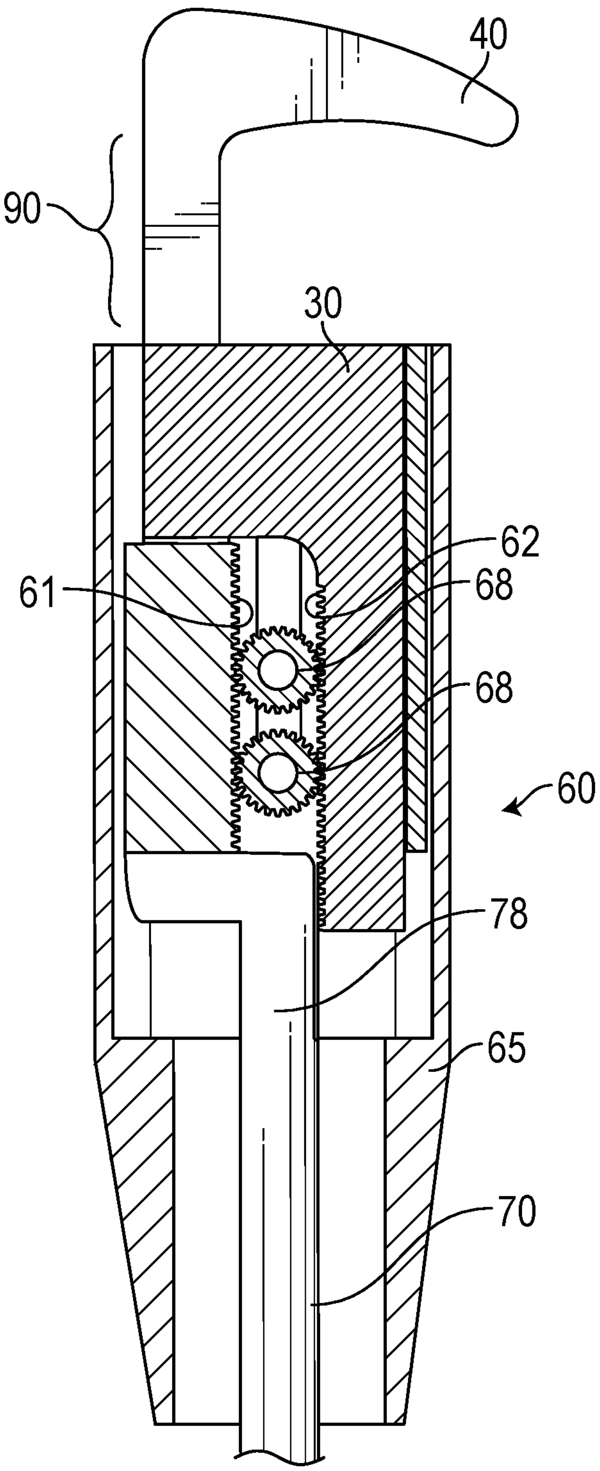
FIG. 4 is a partial side elevational view of one embodiment of the invention, with certain components rendered as transparent, shown configured with a linear cutting mechanism and more than one pinion gear.
Figure 5:
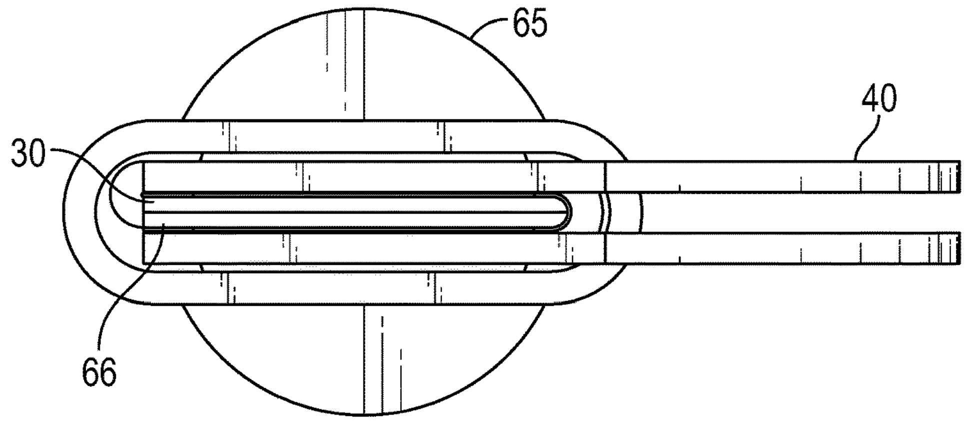
FIG. 5 is a partial top plan view of one embodiment of the invention, shown configured with a rotational cutting mechanism.
Figure 6:
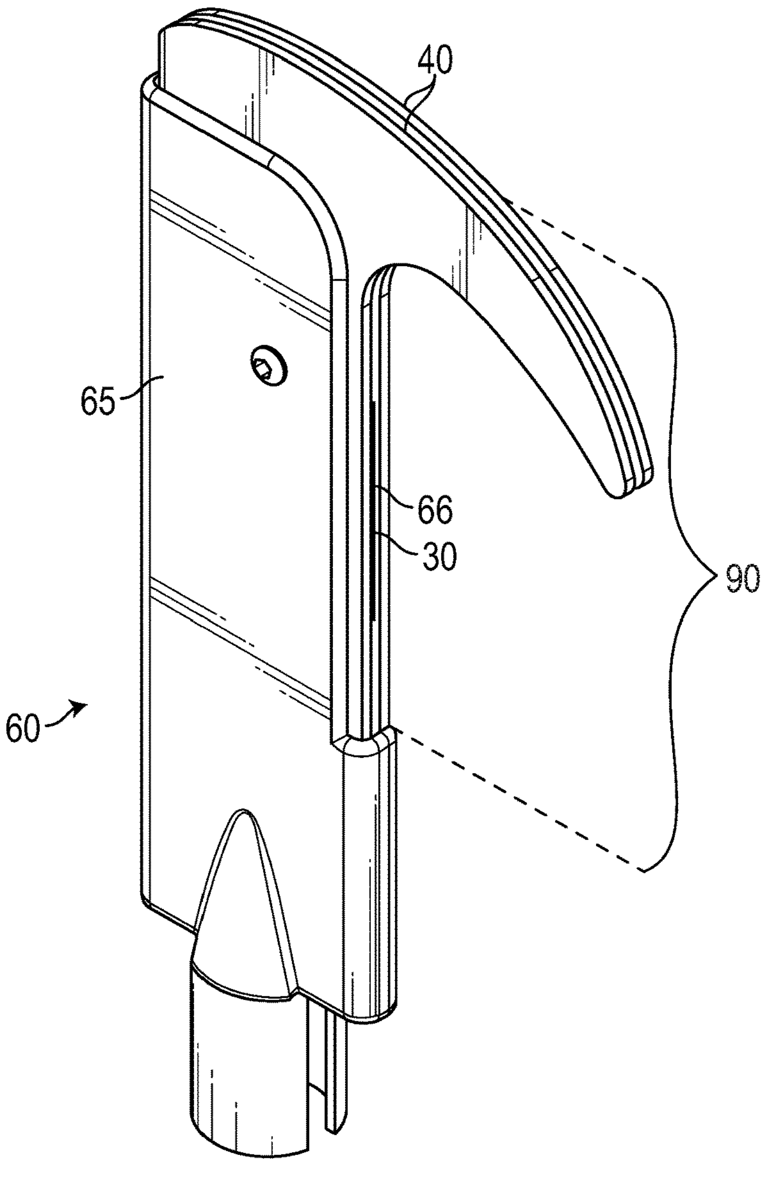
FIG. 6 is a partial front perspective view of one embodiment of the invention, shown configured with a rotational cutting mechanism.
Figure 7:
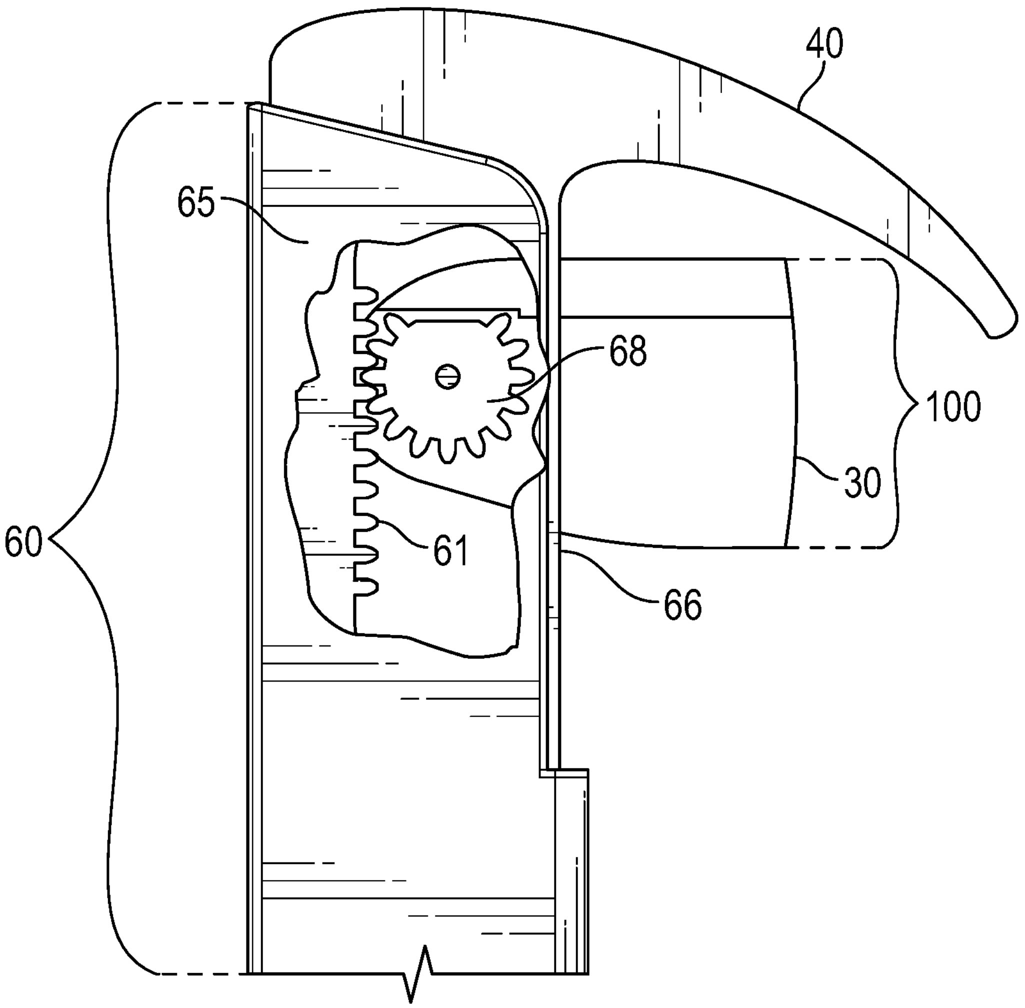
FIG. 7 is a partial cut away side elevational view of one embodiment of the invention, shown configured with a rotational cutting mechanism in the open position.
Figure 8:
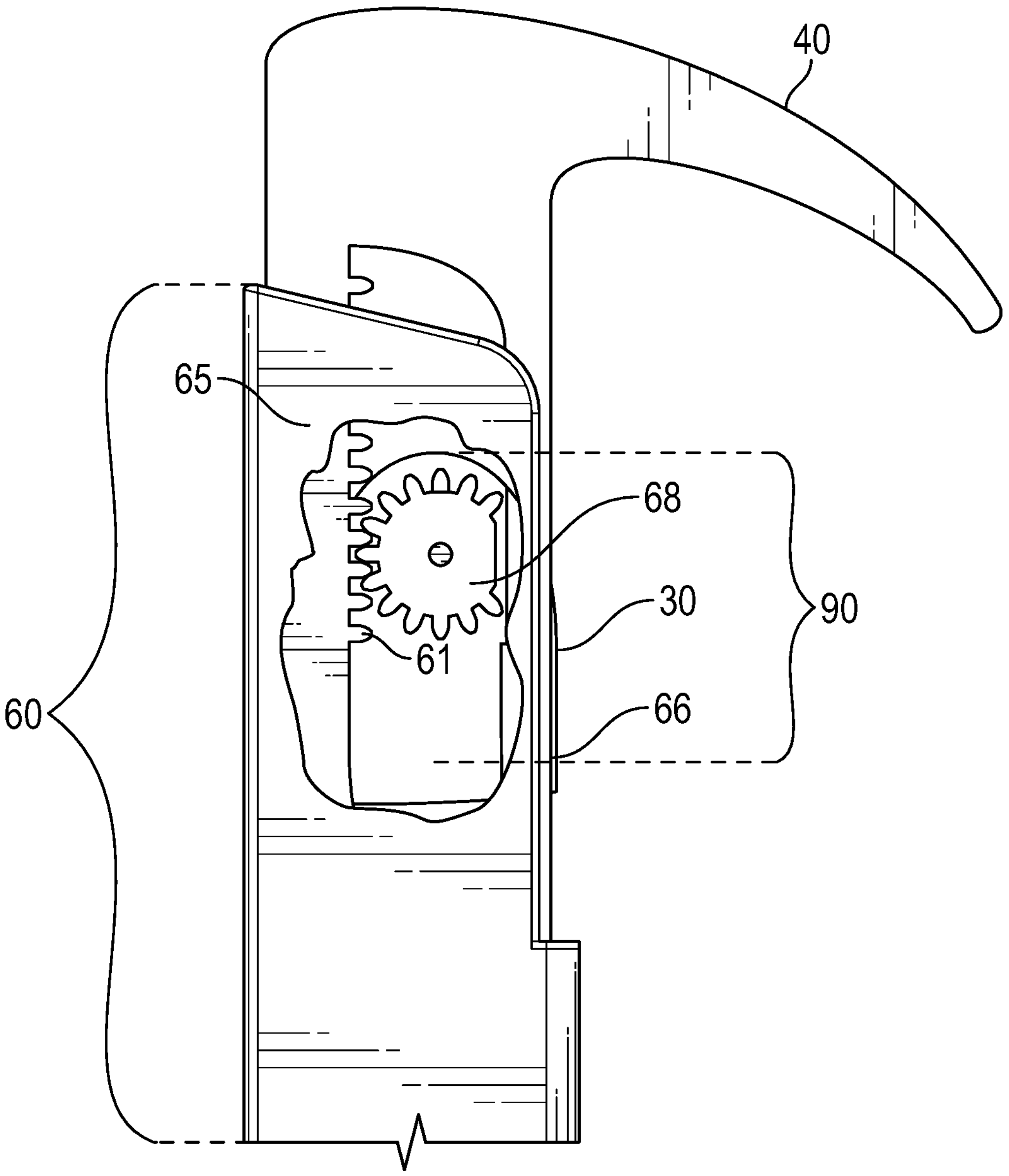
FIG. 8 is a partial cut away side elevational view of one embodiment of the invention, shown configured with a rotational cutting mechanism in the closed position.
Figure 9:
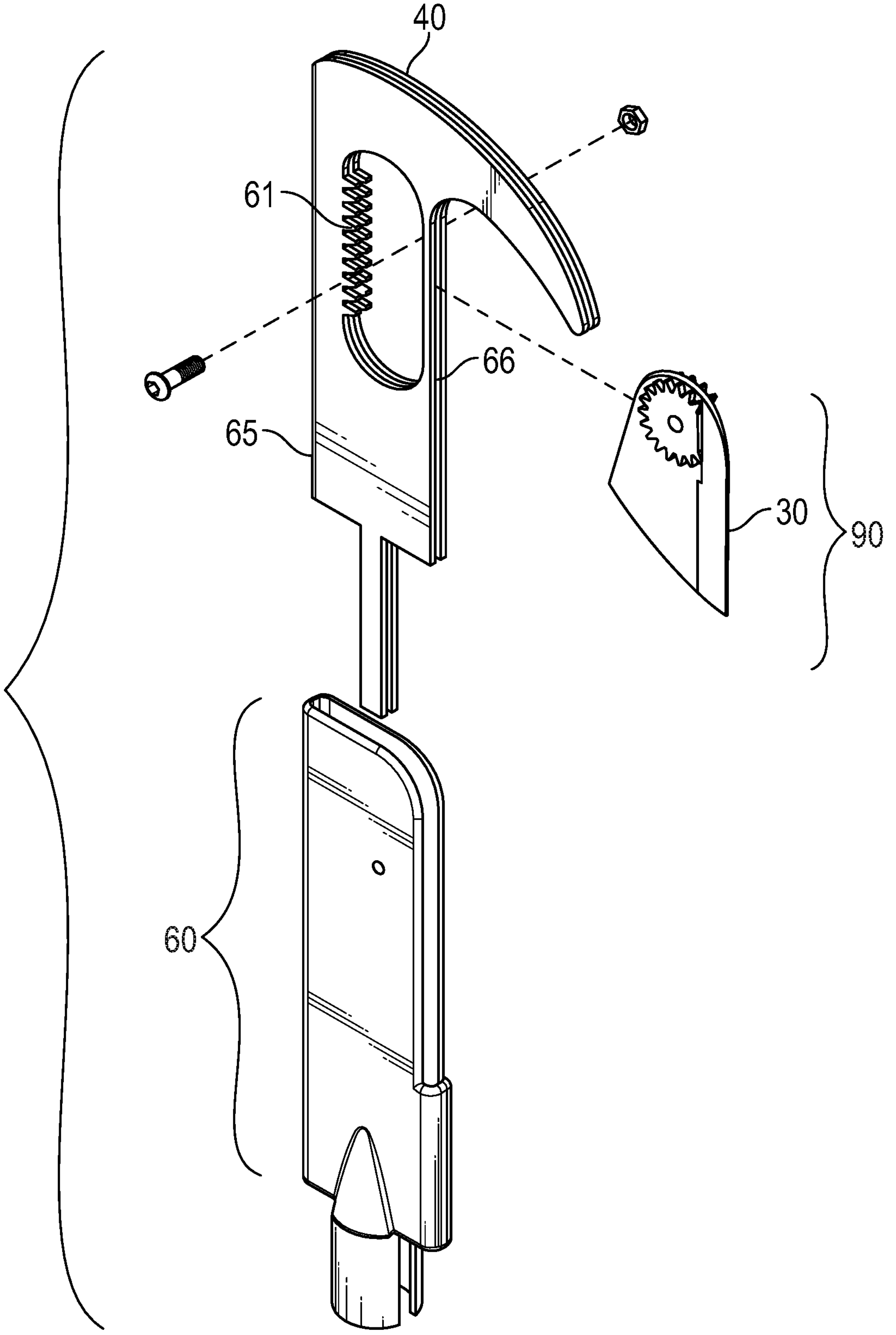
FIG. 9 is a partial exploded perspective view of one embodiment of the invention, shown configured with a rotational cutting mechanism.

FIGS. 1-9 illustrate a cutting tool 10 (FIGS. 2A, 2B) for use to cut an object (not shown). The cutting tool 10 comprises, in some embodiments, an elongated first handle 20 (FIGS. 2A, 2B) having a distal end 28 (FIGS. 2A, 2B) and a proximal end 22 (FIGS. 2A, 2B). Preferably, the first handle 20 is hollow and defines a cavity 21 (FIG. 3) therewithin. The cutting tool 10 further comprises an extension mechanism 60 (FIGS. 2A, 2B, 3-4, 6-9) fixed with the distal end 28 of the first handle 20 and having a housing 65 (FIGS. 2A, 2B, 3-9). The housing 65 has a blade slot 66 (FIGS. 2A, 2B, 3, 5-9) and further includes at least partially therein a blade 30 (FIGS. 2B, 3-9). The blade 30 is connected with at least one pinion gear 68 (FIGS. 3-4, 7-8), and the at least one pinion gear 68 is rotationally fixed with the housing 65. The housing 65 further includes an extension rod 70 (FIGS. 2A, 2B, 3-4) having a proximal end 72 (FIGS. 2A, 2B) fixed slidably within or alongside the first handle 20 and a distal end 78 (FIGS. 2A, 2B, 3-4) terminating at a rigid hook 40 (FIGS. 2A, 2B, 3-9). The rigid hook 40 has a first gear rack 61 (FIGS. 3-4, 7-9) engaged with the at least one pinion gear 68. As such, as the extension rod 70 moves the hook 40 in one direction, the pinion gear(s) 68 spin to move the blade 30 in the opposite direction. In those preferred embodiments where the first handle 20 is hollow and defines a cavity 21 therewithin, the extension rod 70, in some embodiments, is slidably disposed within the cavity 21 (FIG. 4). The extension rod 70 may alternately be rotated (FIG. 3), such as by a motor (not shown) or the like, the distal end 78 threadably engaged with a nut 79 to move the rigid hook 40 and pinion gear 68. The distal end 78 is shown threaded in FIG. 3, but the proximal end 72 can alternately be threaded so that the extension rod 70 slides within the first handle 20, a nut 79 being fixed with the motor (not shown) in such an embodiment. In the embodiments illustrated, the distal end 78 is connected with the hook 40. However, the distal end 78 may also be connected with the blade 30, with the hook 40 being connected to the distal end 78 through the pinion gear 68.

The cutting tool 10 further comprises a second handle 80 (FIGS. 2A, 2B) pivotally fixed with the first handle 20 and the proximal end 72 of the extension rod 70. In some embodiments, the distal end 78 of the extension rod 70 is fixed with the blade 30, whereby bringing the first handle 20 and the second handle 80 together causes the extension rod 70 to press the blade 30 forward towards the rigid hook 40 while, at the same time and through the at least one pinion gear 68, the rigid hook 40 is brought reward towards the cutting blade 30. When the rigid hook 40 and the cutting blade 30 meet at the closed positions 100 the object is severed.

Alternately, the distal end 78 of the extension rod 70 may be fixed with the rigid hook 40 (FIG. 3), such that pulling the extension rod 70 rearward along with the rigid hook 40 causes the at least one pinion gear 68 to rotate to drive the blade 30 forward towards the rigid hook 40. Different mechanisms for translating the motion of the second handle 80 with respect to the first handle 20 can be utilized to effect either embodiment.

Preferably, the first handle 20 and the second handle 80 are both made of a strong and rigid material. Also preferably, the housing 65, the rigid hook 40, the blade 30, and the extension rod 70 are each made from a strong and rigid material. Such materials may include metal; thermoplastic; carbon fiber; carbon nanotubes; or any other material of at least as much strength and rigidity, such that the material is suitable for use in the manufacture of the cutting tool 10.

In some preferred embodiments of the cutting tool 10 the at least one pinion gear 68 drives the blade 30 via a second gear rack 62 (FIGS. 3, 4). In such embodiments ("*Linear Cutting Mechanism Embodiments*"), the blade 30 and the rigid hook 40 move linearly towards or away from each other when the second handle 80 is actuated. Some possible configurations of the Linear Cutting Mechanism Embodiments are depicted in FIG. 2A, FIG. 2B, and FIG. 3 through FIG. 5. In other preferred embodiments, the at least one pinion gear 68 is fixed directly to the blade 30. In such embodiments ("*Rotational Cutting Mechanism Embodiments*"), when the second handle 80 is actuated, the blade 30 moves rotationally towards or away from the rigid hook 40, and the rigid hook 40 moves linearly towards or away from the distal end 28 of the first handle 20. Some possible configurations of the Rotational Cutting Mechanism Embodiments are depicted in FIG. 6 through FIG. 9.

In some preferred embodiments, the cutting tool 10 further comprises a linear actuator 200 (FIG. 2C) electrically connected between a switch 210 and a power source 220. The power source may be a battery, a wired or wireless interface to a local electric grid, a portable generator or any type, or any other power source capable of and suitable for providing power to a cutting tool 10. Preferably, the switch 210 is situated near the proximal end 22 of the first handle 20, and is a momentary switch 210 that actuates the blade 30 to move from the open position 90 to the closed position 100 and then back to the open position 90 in one cycle. Alternately the switch 210 further comprises a three-position rocker (not shown) that has an open position configured to move the rigid hook 40 and the blade 30 towards the open position 90; a close position configured to move the rigid hook 40 and the blade 30 towards the closed position 100; and a central off position configured to lock the rigid hook 40 and the blade 30 in place.

The linear actuator 200 is mechanically fixed with the extension rod 70 and configured to move the extension rod 70 within (FIG. 2C) or alongside (not shown) the first handle 20 to move the blade 30 and the rigid hook 40 between the open position 90 and the closed position 100. Preferably, the linear actuator 200 includes a hydraulic or pneumatic cylinder or an electric motor (not shown).

In use, actuation of the second handle 80 moves the rigid hook 40 and the blade 30 between an open position 90 (FIGS. 2A, 3-4, 6, 8-9), wherein the object may be placed between the rigid hook 40 and the blade 30, and a closed position 100 (FIGS. 2B, 7), wherein the blade 30 passes through the blade slot 66 and meets the retracting rigid hook 40 to cut the object.

Figure 10:
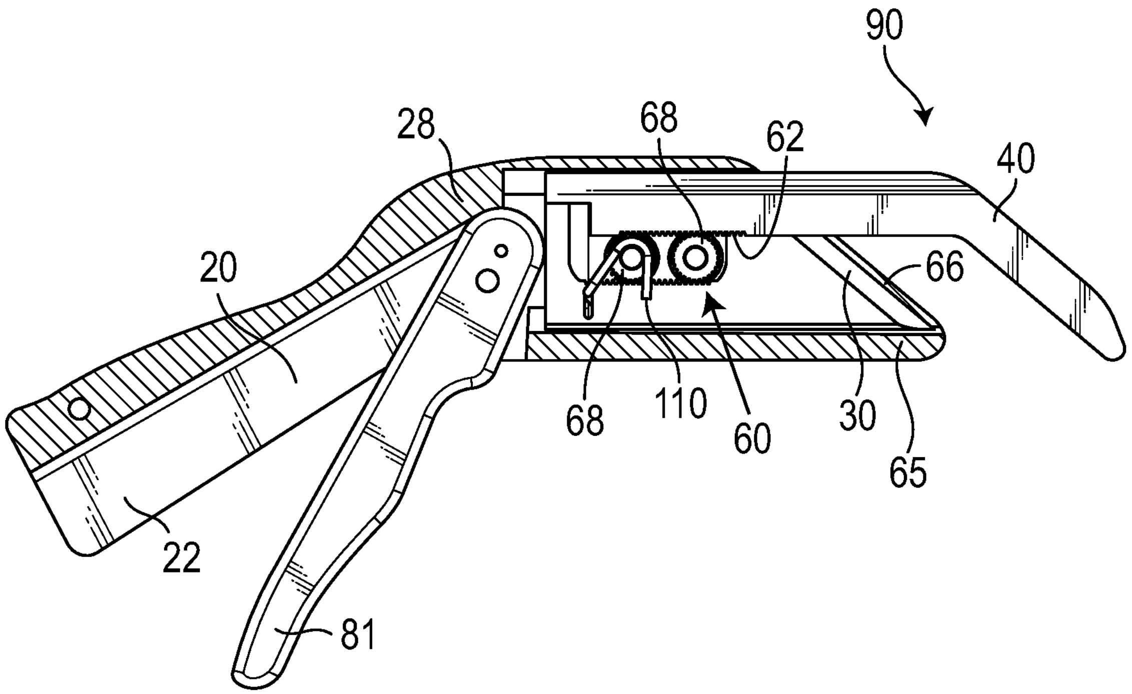
FIG. 10 is a partial cut away side elevational view of a hand-actuated embodiment of the invention.

FIG. 10 illustrates an alternate hand-actuated embodiment having a shorter first handle 20 having the distal end 28 and the proximal end 22. The extension mechanism 60 is fixed with the distal end 28 of the first handle 20 and has the housing 65 with the blade slot 66. The housing 65 includes at least partially therein the blade 30 connected with the at least one pinion gear 68 rotationally fixed with the housing 65, and the rigid hook 40 with the first gear rack 62 engaged with the at least one pinion gear 68. A second hand-actuated handle 81 is pivotally fixed with the distal end 28 of the first handle 20 and configured to press against the extension mechanism 60 when actuated. As such, actuation of the second handle 81 pushes the blade 30 towards the hook 40, which is pulled down by the extension mechanism 60 and specifically the pinion gears 68 rotating to move the hook 40 down towards the blade 30. In such an embodiment, a spring 110 is configured to urge the blade 30 into the open position 90.

While a particular form of the invention has been illustrated and described, it will be apparent that various modifications can be made without departing from the spirit and scope of the invention. For example, the blade 30 may be made from carbon steel; iron; D2 tool steel, zirconium dioxide (ceramic); titanium; aluminum; fiberglass; thermoplastic; or any other material suitable for cutting the types of objects that a particular embodiment of the cutting tool 10 is configured to cut. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above.

The elements and acts of the various embodiments described above can be combined to provide further embodiments.

Any element in a claim that does not explicitly state "means for" performing a specified function or "step for" performing a specified function is not to be interpreted as a "means" or "step" clause as specified in 35 U.S.C. § 112(f). In particular, any use of "step of" in the claims herein is not intended to invoke the provisions of 35 U.S.C. § 112(f).

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above Detailed Description. While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A cutting tool for cutting an object, comprising:

an elongated first handle having a distal end and a proximal end;

an extension mechanism fixed with the distal end of the first handle and having a housing having a blade slot, the housing including at least partially therein a blade and at least one pinion gear rotationally fixed with the housing, the at least one pinion gear interacting to linearly move the blade through the blade slot and an extension rod having a proximal end fixed slidably within or alongside the first handle and a distal end terminating at a rigid hook having a first gear rack engaged with the at least one pinion gear, wherein the at least one pinion gear is fixed with the blade at a second gear rack, wherein the blade and the rigid hook move linearly towards or away from each other when a second handle is actuated; and the second handle pivotally fixed with the first handle and the proximal end of the extension rod;

whereby actuation of the second handle moves the rigid hook and the blade between an open position, wherein the object may be placed between the rigid hook and the blade, and a closed position, wherein the blade passes through the blade slot and meets the retracting rigid hook to cut the object.

2. The cutting tool of claim 1 wherein the first handle and the second handle are both made of a rigid material.

3. The cutting tool of claim 1 wherein the first handle is hollow and defines a cavity therewithin, the extension rod being slidably disposed within the cavity.

4. The cutting tool of claim 1 wherein the housing, the rigid hook, the blade, and the extension rod are each made from a rigid material.

* * * * *